United States Patent [19]

Barthel et al.

[11] Patent Number: 4,468,600
[45] Date of Patent: Aug. 28, 1984

[54] APPLIANCE CONTROLLER

[75] Inventors: Richard C. Barthel, Chicago, Ill.; Richard D. Roy, Valparaiso, Ind.

[73] Assignee: The Singer Company, Stamford, Conn.

[21] Appl. No.: 478,137

[22] Filed: Mar. 23, 1983

[51] Int. Cl.³ .............................................. G05B 19/06
[52] U.S. Cl. ................................... 318/452; 318/485; 318/696; 200/37 A; 200/38 B; 200/27 B; 134/58 D
[58] Field of Search ........................... 34/45; 68/12 R; 134/57 D, 58 D; 200/37 A, 38 B, 38 BA, 27 B, 283; 328/72, 75; 340/309.4; 371/29; 318/485, 452; 307/141, 141.4, 141.8; 364/140, 143, 400

[56] References Cited

U.S. PATENT DOCUMENTS

| | | | |
|---|---|---|---|
| 3,639,844 | 2/1972 | Karklys | 328/130 |
| 3,662,186 | 5/1972 | Karklys | 307/141 |
| 3,774,056 | 11/1973 | Sample et al. | 307/293 |
| 3,790,815 | 2/1974 | Karklys | 307/141 |
| 3,840,752 | 10/1974 | Eshraghian | 307/141 |
| 3,922,889 | 12/1975 | Karklys | 68/12 R |
| 3,986,040 | 10/1976 | Karklys | 307/141 |
| 4,161,679 | 7/1979 | Kohn et al. | 318/685 X |
| 4,187,499 | 2/1980 | Scheer | 340/309.4 X |
| 4,245,309 | 1/1981 | Kiefer | 364/400 |
| 4,291,238 | 9/1981 | Braga et al. | 307/141.4 |
| 4,370,566 | 1/1983 | Perry et al. | 307/141 |

Primary Examiner—J. V. Truhe
Assistant Examiner—Bentsu Ro
Attorney, Agent, or Firm—David L. Davis; Robert E. Smith; Edward L. Bell

[57] ABSTRACT

A microcomputer-based electronic controller for a dishwasher utilizes a motor driven timing cam for selectively energizing the electromechanical components of the dishwasher. An internal diagnostic routine in the microcomputer insures that the timing cam is advanced when the microcomputer calls for power to be applied to the motor.

9 Claims, 6 Drawing Figures

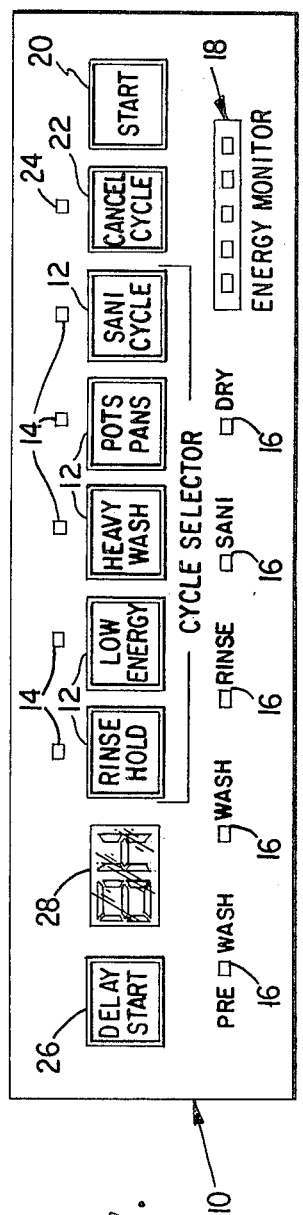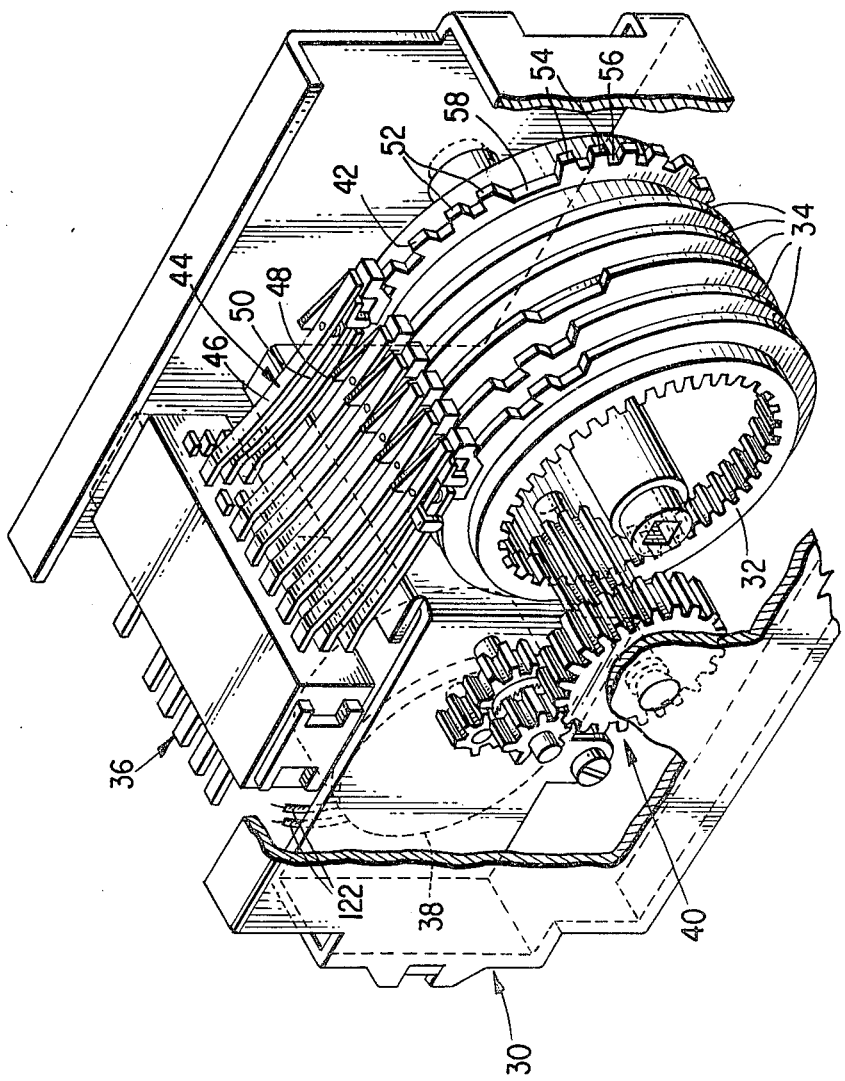

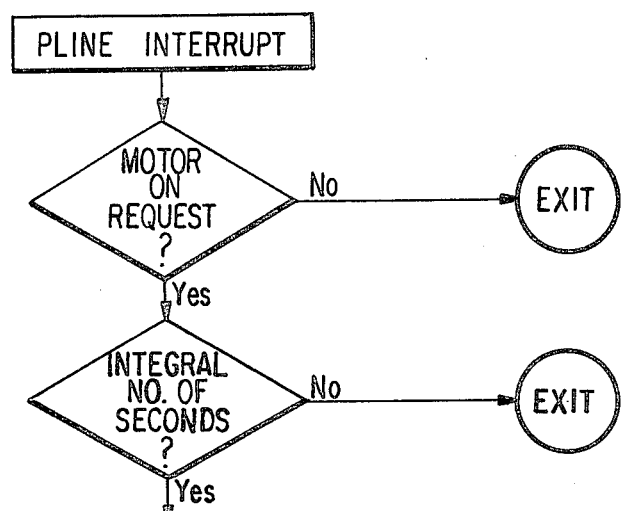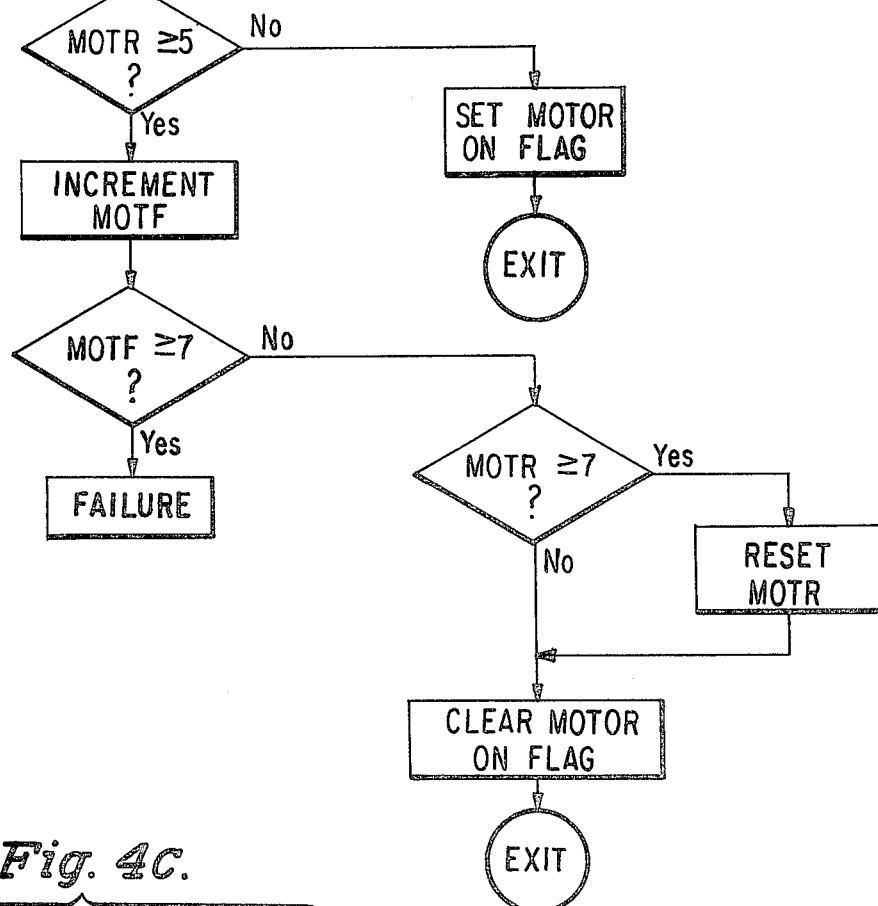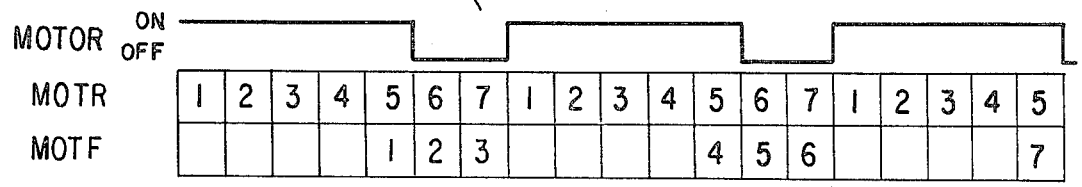

APPLIANCE CONTROLLER

DESCRIPTION

BACKGROUND OF THE INVENTION

This invention relates to consumer appliances and, more particularly, to an electronically-based controller for such appliances.

In the past, consumer appliances such as dishwashers, clothes washers, or the like, wherein a user selects an operating cycle of the appliance, have utilized an electromechanical sequencer for control purposes. Typically, such a sequencer includes a motor driven rotating drum having a plurality of cam tracks thereon. Cam followers riding on the cam tracks operate switches which control the application of power to the various electromechanical components of the appliance. While generally effective, such a sequencer suffers from a number of disadvantages. For example, the range of these sequencers is limited by the drum rotation speed and the number of positions required in the cams. An additional limitation is in the lack of flexibility in cycle selection which results in limited available options and only minor cycle to cycle differences. Further, the ability to perform diagnostic routines is severely limited when using an electromechanical sequencer.

In order to overcome the foregoing disadvantages of an electromechanical sequencer, it has been proposed to utilize an electronic controller. Some of the proposed electronic controllers utilize a microprocessor or microcomputer as the main sequence controller. In any event, these electronic controllers use individual outputs with relays to drive the electromechanical components of the appliance. Such a design has the disadvantage that it requires a substantial number of electronic outputs and associated drive circuitry.

It is therefore an object of this invention to provide an appliance controller having the versatility of an electronic controller but still retaining the output simplicity inherent with an electromechanical sequencer.

It is another object of this invention to provide such a controller having the capability of checking for the proper operation of the electromechanical sequencer.

SUMMARY OF THE INVENTION

The foregoing, and additional, objects are attained in accordance with the principles of this invention by providing a controller for an appliance having a plurality of selectively energizeable electromechanical components. The controller comprises input means through which the operator may select a desired cycle of operation of the appliance, a motor and switching means coupled to be driven by the motor and having a plurality of timing cams on a rotating member for controlling the operation of a plurality of switches for applying power to energize the electromechanical components. The controller further includes a sequencer which applies power to the motor and removes power from the motor at appropriate intervals to control the energization of the electromechanical components. The sequencer further includes means for detecting incremental movement of the rotating member and means for applying power to the motor for a defined number of incremental movements.

BRIEF DESCRIPTION OF THE DRAWINGS

The foregoing will be more readily apparent upon reading the following description in conjunction with the drawings wherein:

FIG. 1 illustrates a user control panel for a dishwasher having a controller constructed in accordance with the principles of this invention;

FIG. 2 is a perspective view of a motor driven timer modified in accordance with the principles of this invention;

FIGS. 4A and 4B are flow charts of subroutines incorporated within the microcomputer of FIG. 3, and FIG. 4C illustrates timing relationships during the running of the subroutine of FIG. 4B.

DESCRIPTION

Figure 3:
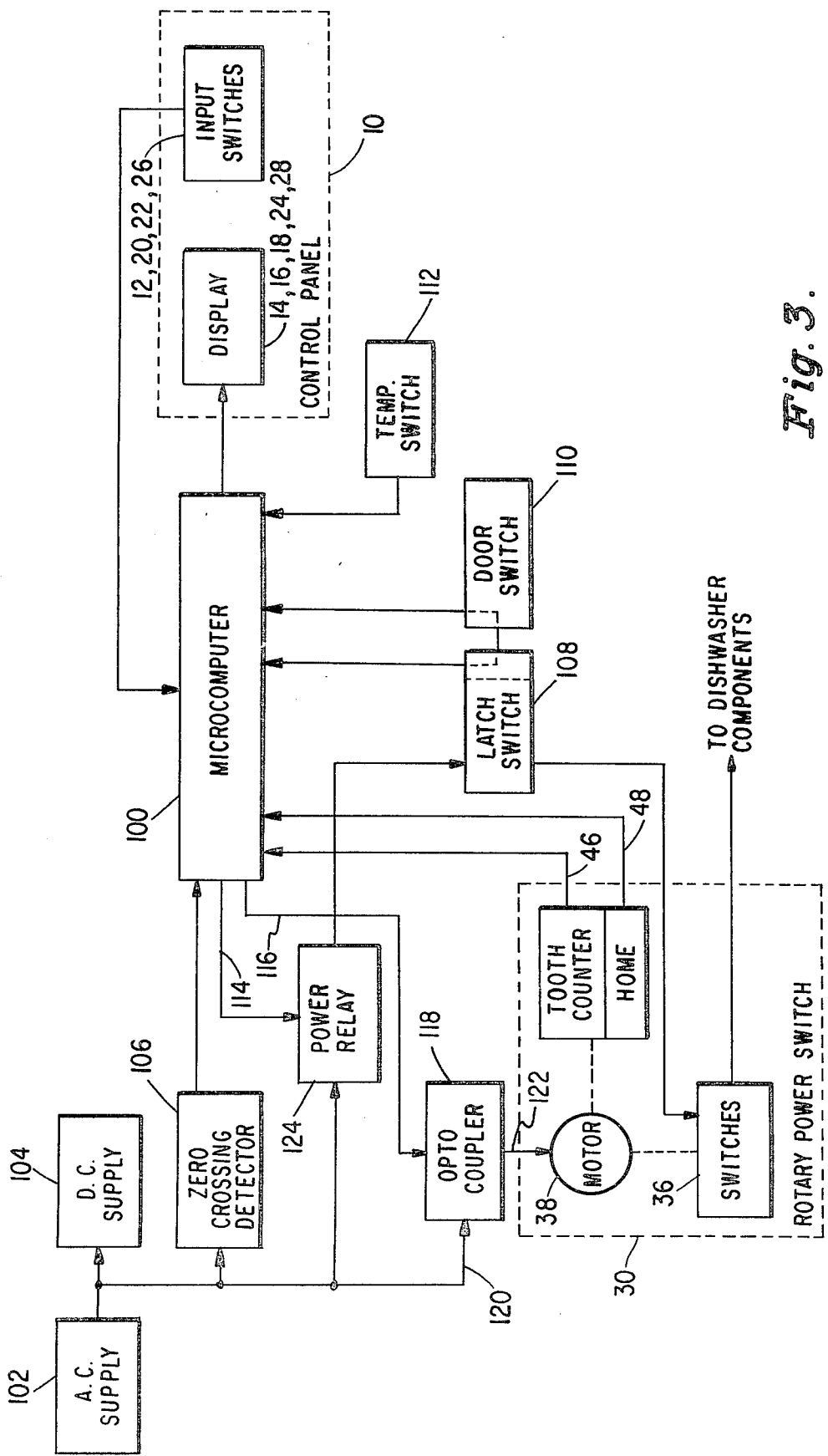
FIG. 3 is a block diagram of a microcomputer-based controller constructed in accordance with the principles of this invention.

Referring now to the drawings, wherein like elements in different figures thereof have the same reference character applied thereto, FIG. 1 shows an illustrative control panel for a dishwasher which has incorporated therein a controller according to the present invention. The control panel, designated generally by the reference numeral 10, contains switches and displays by which the user can interface with the appliance controller. As illustrated in FIG. 1, the panel switches comprise a plurality of membrane touch switches 12, which, when touched, close a circuit for providing a signal to the microcomputer (FIG. 3), to enable the user to select one of a variety of available dishwashing cycles. Adjacent each of the switches 12 is a light emitting diode (LED) 14 which the microcomputer causes to be energized as a confirmation of receipt and acceptance of a user's cycle selection. The control panel also includes an array 16 of light emitting diodes which indicates the current portion of the cycle being executed. A second array 18 of light emitting diodes is provided to indicate the relative amount of energy expended by a selected cycle in order to encourage the user to select energy efficient cycles. Like the LED's 14, the microcomputer controls the energization of the LED's 16 and 18.

The control panel 10 also includes a switch 20 utilized to start the execution of a selected cycle, a switch 22 and associated light emitting diode 24 to cancel a selection, and a switch 26 utilized to activate a timing sequence whereby the dishwasher is started at some later time. The control panel 10 further includes a two digit, seven segment display 28 which is controlled by the microcomputer to display the delay start time selected by the user via the switch 26, the time remaining in the cycle, or one of several fault indications.

FIG. 2 illustrates a motor driven rotary power switch (timer) designated generally by the reference numeral 30, which is utilized in accordance with the present invention to selectively control the application of power to the various electromechanical components of the appliance. In the illustrative embodiment wherein the appliance is a dishwasher, such electromechanical components may include a pump, a solenoid actuated drain valve, a solenoid actuated fill valve, one or more water heaters, one or more dish cups, a rinse dispenser, an air heater and a blower, as is well known in the dishwasher art. Accordingly, the rotary power switch 30 includes a timing cam drum 32 having five cam tracks thereon. These cam tracks 34 cooperate with a bank of follower switches 36 in a well known manner to selectively energize the dishwasher components at the appropriate times in accordance with the program cut into the cam tracks 34. The drum 32 is coupled to a motor 38 through a gear train 40 so that continuous rotation of the motor 38 causes a corresponding continuous rotation of the drum 32.

In accordance with the principles of this invention, the drum 32 is provided with a sixth cam track 42 which is utilized, in a manner to be fully described hereinafter, as feedback to the microcomputer (FIG. 3) as to the present angular position of the drum 32. Accordingly, there is provided a follower switch blade set 44 of the type disclosed, for example, in U.S. reissue Pat. No. Re 29,158. This set 44 includes an upper passive blade 46, a lower passive blade 48 and a middle active blade 50. The cam track 42 is arranged with a plurality of teeth 52 arranged so that at their outer tips 54 contact is made between the middle active blade 50 and the upper passive blade 46 while at the root level 56 between the teeth 52 the middle active blade 50 contacts neither the upper passive blade 46 nor the lower passive blade 48. The cam track 42 is also provided with a region 58 where the surface is lower than the surfaces of the roots 56 so that when the follower on the active blade 50 is in the region 58, contact is made between the blades 50 and 48. The region 58 defines a "home" position for the drum 32, while the teeth 52 define incremental positions around the drum 32.

Referring now to FIG. 3, shown therein is a block diagram of a microcomputer-based controller for a dishwasher utilizing the rotary power switch 30, described above and shown in FIG. 2, and interfacing with the control panel 10, described above and shown in FIG. 1. Accordingly, as shown in FIG. 3, the appliance controller includes a programmed microcomputer 100 arranged to receive input commands from the input switches 12, 20, 22 and 26 on the control panel 10 and further arranged to control the application of power to the motor 38 within the rotary power switch 30 which causes the switches 36 to control the application of power to the various electromechanical components of the dishwasher. The controller shown in FIG. 3 is connected to an AC supply 102 which may be any commercially available AC power source, such as a conventional 110 volt 60 hertz home power line. The AC supply 102 provides power to a DC supply 104 which converts the AC power to DC power for use by the electronics in the controller. The AC supply 102 is also conected to a zero crossing detector 106 which provides input signals to the microcomputer 100 at the zero crossings of the AC voltage wave form as timing input signals to the microcomputer 100. As is conventional, the dishwasher includes a latch switch 108 and a door switch 110 which are connected together and to the microcomputer 100 as an interlock circuit. A temperature switch 112 provides an input signal to the microcomputer 100 when the water temperature reaches a predetermined value. The last inputs to the microcomputer 100 are from the tooth counter switch 46 and the "home" position switch 48. The microcomputer 100 processes all these input signals and provides output signals to control the display 14, 16, 18, 24 and 28 on the control panel 10 and also provides output signals on the leads 114 and 116 to control the application of power to the dishwasher components and the motor 38 of the rotary power switch 30, respectively, as will be described in more detail hereinafter.

The following description of operation will be from the point of view of a user of the dishwasher. The user only sees the control panel 10 so the discussion will be directed to the control panel 10 plus a general description of the dishwasher operation. When power is first applied to the dishwasher, the microcomputer 100 will provide a signal on the lead 116 to energize the optocoupler 118 to allow AC power to flow from the AC supply 102, through the leads 120, to the leads 122 to the motor 38. Power will continue to be applied to the motor 38 until the rotary power switch 30 reaches the home position, as indicated by a signal from the home switch 48. At this time, one of the cam tracks 34 corresponding to the drain valve will cause the appropriate switch 36 to be closed to allow AC power to be supplied to the drain valve through the power relay 124, which is energized by a signal on the lead 114, and through the latch switch 108. The drain valve is energized for 30 seconds. If the rotary power switch 30 had already been at its home position, no drain is performed. After the application of power, the letters "PF" appear at the display 28 and all other display lights are out. The switches on the control panel 10 are all inactive except for the cancel switch 22. Without a cancel switch input, the dishwasher will remain inactive after the initial drain cycle but the "PF" will remain on the display. The foregoing applies for the initial application of power to the dishwasher as well as any subsequent power application after power failures.

Whenever the cancel switch 22 is pressed, the letters "CA" appear on the display 28 and the cancel light 24 is lit. If the rotary power switch 30 is not at the home position, the microcomputer 100 causes it to be advanced to the home position and a 30 second drain cycle is performed. At the end of the 30 second drain cycle, the microcomputer 100 goes into an idle mode, turning off the entire display and activating all of the panel switches. The drain operation associated with the cancel function can be prevented by the user pressing the cancel switch 22 a second time.

The microcomputer 100 goes into the idle mode after each completed cycle or cancel switch input. When in the idle mode, if the start switch 20 is pressed, the microcomputer 100 will cause the dishwasher to run the last cycle which had been selected. If the start switch 20 had been pressed after a power failure and a cancel switch input, then a low energy cycle is run with the sani rinse and energy saver both off. Once the start switch 20 is pressed, the microcomputer 100 displays the cycle and options to be run along with the total minutes in the cycle. The first operation of every cycle is a 30 second drain operation which starts when the start switch 20 is pressed. During this initial 30 second drain operation, the user can change the cycle selected. The user selects the desired cycle via the switches 12. The five lights forming the energy monitor 18 display the relative energy usage for each wash cycle and option. Once the start switch 20 is pressed and the initial 30 second drain is complete, the microcomputer 100 causes the dishwasher to perform the selected wash cycle. The cycle monitor lights 16 identify which portion of the wash cycle is currently being performed. The minutes displayed in the cycle time display 28 will count down to the completion of the cycle. The countdown will be halted during the heat up periods of the sani rinse portion of the cycle and will resume afterwards. At the end of a wash cycle, the microcomputer 100 will go into the idle mode.

If the user wishes to start the dishwasher at a later time, the delay wash switch 26 provides this capability. Pressing the delay wash switch 26 for the first time causes the display 28 to show "9H". Pressing the switch 26 a second time decreases the count by one to "8H". If the switch 26 is held down, the count is automatically decreased one at a time to "1H". Pressing the switch or holding it longer will make the microcomputer 100 recycle the count to "9H" and continue down from there. The displayed number indicates the number of hours of delay before the dishwasher will start automatically. If the start switch 20 is now pressed, the delay cycle will begin. Pressing the cancel switch 22 will stop the delay wash function. Each time a delay wash is selected, the initial hours of delay which are displayed will be that amount selected the previous time.

The software imbedded in the microcomputer 100 is structured to respond to inputs from the control panel 10 to cause the rotary power switch 30 to be sequentially advanced to different positions thereof so that a user selected cycle and options are performed. Each wash cycle is built up from a selected series of operating steps. Each of the operating steps is structured with a control of the power relay 124 and advancement of the rotary power switch 30 by a predetermined number of tooth increments, and a time delay of operation. Any step that is not a part of a particular wash cycle is skipped over and the rotary power switch 30 is appropriately advanced past the interval corresponding to that step. Accordingly, the drum 32 is subdivided into a plurality of intervals, each of which corresponds to a tooth 52. The microcomputer 100 keeps track of the number of tooth increments away from the home region 58 that the drum 32 is presently situated at. At each of these intervals, appropriate ones of the switches 36 are closed so that power may be selectively applied to one or more of the dishwasher components when the drum 32 is stopped at that position. Depending upon the selected cycle, the microcomputer 100 causes the drum 32 to be moved in a predetermined manner, stopping at predetermined intervals for predetermined lengths of time.

Figure 4A:
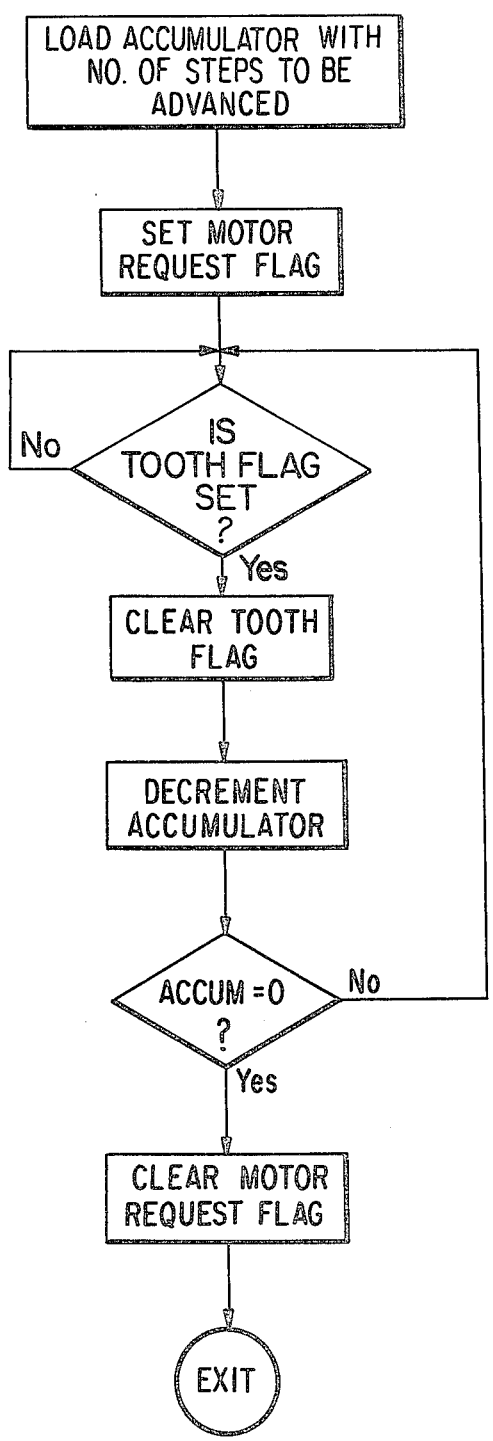

FIG. 4A illustrates a flow chart of a subroutine in the software imbedded in the microcomputer 100 for advancing the rotary power switch 30. Thus, as is shown in FIG. 4A, an accumulator is loaded with a number representing the number of steps that the rotary power switch 30 is to be advanced. At any given point in the programmed cycle sequence, the microcomputer 100 is programmed with the proper number to be loaded into the accumulator. Next, a motor request flag is set. The microcomputer 100 recognizes the setting of this motor request flag for applying a signal to the lead 116 which causes the optocoupler 118 to apply AC power from the supply 102 to the motor 38. The microcomputer 100 then checks for a tooth signal by looking to see whether the tooth flag has been set. The tooth flag is set by a transition of the switch 46 from the closed condition to the open condition. When a tooth signal is detected, the tooth flag is cleared and the accumulator is decremented. If the contents of the accumulator are not equal to zero, this process is continued. When the contents of the accumulator have been decremented to zero, the motor request flag is cleared. This causes power to be removed from the motor 38, stopping the rotary power switch 30 at the desired interval.

In order to insure that the rotary power switch 30 is actually advancing, the microcomputer 100 includes an internal diagnostic subroutine. Basically, the diagnostic subroutine starts a five second internal timer with power applied to the rotary power switch 30. If a tooth signal is received during this first five seconds, the timer is restarted and waits for the next tooth signal. If a tooth signal is not received within five seconds, the motor 38 is turned off for two seconds. The motor 38 is then turned back on for five seconds. If a tooth signal is still not received, the motor is turned off for two more seconds. The motor 38 is then turned on for a third five second period. If a tooth signal still has not appeared before the end of this third application of power to the motor 38, the microcomputer 100 considers this a failure and goes into a failure mode wherein all the operations of the dishwasher are stopped and the wash light in the monitor display 16 is energized. The microcomputer 100 remains in this failure mode until power is removed from the dishwasher.

A flow chart for this subroutine is illustrated in FIG. 4B. This subroutine is entered whenever a power line interrupt signal is generated on alternate zero crossings of the AC voltage. When this subroutine is entered, the first thing to occur is a check to see whether there is a request that the motor 38 be on. If not, the subroutine is exited. Next, since the power line interrupt occurs 60 times per second, a check is made to see whether an integral number of seconds has occurred since a request to turn on the motor was made. If not, the subroutine is exited. This subroutine utilizes two counters; MOTR (motor on/off recycle counter) and MOTF (motor failure counter). Whenever a tooth signal is received, both MOTR and MOTF are reset. MOTR is incremented whenever a full second has elapsed and the motor request is on. Whenever MOTR is less than five, the motor on flag is set and the subroutine is exited. If MOTR is greater than or equal to five, MOTF is incremented. If MOTF is greater than or equal to seven, this indicates a failure. If MOTF is less than seven, MOTR is checked to see whether it is greater than or equal to seven. If yes, then MOTR is reset. If MOTR is less than seven, the motor on flag is cleared to remove power from the motor 38 and the subroutine is exited. FIG. 4C shows the relationship between the motor being on/off, MOTR and MOTF.

Accordingly, there has been disclosed an electronic appliance controller utilizing a motor driven timing cam wherein a diagnostic routine is provided for insuring that the timing cam is advanced. It is understood that the above-described arrangement is merely illustrative of the application of the principles of this invention. Numerous other arrangements may be devised by those skilled in the art without departing from the spirit and scope of this invention, as defined by the appended claims.

I claim:

1. A controller for an appliance having a plurality of selectively energizeable electromechanical components, comprising:
   input means for operator selection of a desired cycle of operation of said appliance;
   a motor;
   switching means coupled to be driven by said motor and having a plurality of timing cams on a rotating member for controlling the operation of a plurality of switches for applying power to energize said components; and
   sequencing means for selectively advancing said switching means including:

means for applying a power to said motor;
means for detecting an incremental movement of said rotating member;
means for operating said power applying means for a defined number of incremental movements of said rotating member;
means for timing a predetermined interval commencing with the actuation of said power applying means; and
means for stopping the operation of said power applying means in the event an incremental movement of said rotating member is not detected during said predetermined interval.

2. The controller according to claim 1 wherein said sequencing means further includes means for timing a defined interval between successive actuations of said power applying means.

3. The controller according to claim 1 wherein said sequencing means further includes means for operating said power applying means for another said predetermined interval after stopping the operation of said power applying means for a second predetermined interval and means for again stopping the operation of said power applying means in the event an incremental movement of said rotating member is not detected during said another said predetermined interval.

4. The controller according to claim 3 wherein said sequencing means further includes means for operating said power applying means for still another said predetermined interval after stopping the operation of said power applying means for another said second predetermined interval and failure means for again stopping the operation of said power applying means in the event an incremental movement of said rotating member is not detected during said still another said predetermined interval.

5. The controller according to claim 4 wherein said failure means includes means for placing said controller in a failure mode wherein said appliance is inactive.

6. The controller according to claim 1 wherein said detecting means includes:
a cam track on said rotating member including a plurality of spaced teeth;
a cam follower associated with said cam track; and
switching means coupled to said cam follower for providing a first circuit condition when said cam follower is in contact with one of the tips of said teeth and providing a second circuit condition when said cam follower is in contact with one of the roots of said teeth.

7. The controller according to claim 6 wherein said sequencing means further includes means for defining a home position of said rotating member.

8. The controller according to claim 1 wherein said sequencing means includes a programmed microcomputer.

9. A controller for an appliance having a plurality of selectively energizeable electromechanical components, comprising:
input means for operator selection of a desired cycle of operation of said appliance;
a motor;
switching means coupled to be driven by said motor and having a plurality of timing cams on a rotating member for controlling the operation of a plurality of switches for applying power to energize said components; and
sequencing means for selectively advancing said switching means including:
means for applying power to said motor;
means for detecting an incremental movement of said rotating member including:
a cam track on said rotating member including a plurality of spaced teeth;
a cam follower associated with said cam track; and
switching means coupled to said cam follower for providing a first circuit condition when said cam follower is in contact with one of the tips of said teeth and providing a second circuit condition when said cam follower is in contact with one of the roots of said teeth;
means for operating said power applying means for a defined number of incremental movements of said rotating member; and
means for defining a home position of said rotating member.

* * * * *